United States Patent
Malouf et al.

(10) Patent No.: US 12,517,165 B1
(45) Date of Patent: Jan. 6, 2026

(54) SYSTEMS AND METHODS FOR ELECTRICAL ISOLATION TESTING FOR A MARINE PROPULSION SYSTEM

(71) Applicant: Brunswick Corporation, Mettawa, IL (US)

(72) Inventors: Travis C. Malouf, Germantown, WI (US); Paul M. Kraus, Fond du Lac, WI (US); Robert R. Osthelder, Winneconne, WI (US)

(73) Assignee: Brunswick Corporation, Mettawa, IL (US)

( * ) Notice: Subject to any disclaimer, the term of this patent is extended or adjusted under 35 U.S.C. 154(b) by 128 days.

(21) Appl. No.: 18/631,565

(22) Filed: Apr. 10, 2024

(51) Int. Cl.
*G01R 31/14* (2006.01)
*G01R 31/00* (2006.01)

(52) U.S. Cl.
CPC ........... *G01R 31/14* (2013.01); *G01R 31/005* (2013.01)

(58) Field of Classification Search
CPC .............................. G01R 31/14; G01R 31/005
See application file for complete search history.

(56) References Cited

U.S. PATENT DOCUMENTS

| | | | |
|---|---|---|---|
| 4,322,633 A * | 3/1982 | Staerzl | C23F 13/04 204/196.36 |
| 5,747,892 A | 5/1998 | Staerzl | |
| 6,024,614 A * | 2/2000 | Burg | B63H 11/103 440/43 |
| 8,118,983 B1 * | 2/2012 | Anderson | C23F 13/04 204/196.04 |
| 11,597,479 B1 * | 3/2023 | Carlson, III | B63H 1/20 |

* cited by examiner

*Primary Examiner* — Paresh Patel
(74) *Attorney, Agent, or Firm* — Andrus Intellectual Property Law, LLP (57) ABSTRACT

A marine propulsion system for propelling a marine vessel includes at least a first marine drive system comprising a first electric marine drive powered by a first power storage system and a second marine drive system comprising a second electric marine drive powered by a second power storage system, a first isolation monitor configured to conduct first isolation testing to test electrical isolation of the first marine drive system, and a second isolation monitor configured to conduct second isolation testing to test electrical isolation of the second marine drive system. The first isolation monitor and the second isolation monitor are communicatively connected, wherein the first isolation monitor and the second isolation monitor are configured to communicate such that the first isolation testing and the second isolation testing are performed sequentially, one at a time.

21 Claims, 7 Drawing Sheets

| | OPERATING POINT | SWITCH 1 | SWITCH 2 | OPERATING STATE |
|---|---|---|---|---|
| OP1 | 1 | ON | OFF | IMM MEASURING |
| OP2 | 2 | ON | ON | IMM MEASURING |
| OP3 | 3 | OFF | OFF | IMM IDLE / WAITING FOR PEER |

SYSTEMS AND METHODS FOR ELECTRICAL ISOLATION TESTING FOR A MARINE PROPULSION SYSTEM

FIELD

The present disclosure generally relates to systems and methods for controlling a plurality of high voltage systems on a marine vessel, and more particularly systems and methods for testing and managing electrical isolation of marine vessel electrical systems.

BACKGROUND

Electric propulsion systems for propelling a marine vessel are known, such as comprising an electric motor rotating a propeller and powered by an on-board power storage system. For example, in-board electric drive systems and outboard electric drive systems have been developed for propelling marine vessels. Different power supply arrangements for powering electric propulsion systems are also known. Such power storage systems include one or more batteries or banks of batteries, and or may include other storage devices such as one or more ultracapacitors, fuel cells, flow batteries, and or other devices capable of storing and outputting electric energy. The electric propulsion system may be configured as a high voltage system with one or more power storage systems comprising a plurality of batteries arranged in parallel or series. Isolation testing of the electric propulsion system, such as at a predetermined period, is required to verify that electrical isolation is maintained.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the disclosure, a marine propulsion system for propelling a marine vessel includes at least two marine drive systems, including a first marine drive system that includes a first electric marine drive powered by a first power storage system and a second marine drive system that includes a second electric marine drive powered by a second power storage system, a first isolation monitor configured to conduct first isolation testing to test electrical isolation of the first marine drive system, a second isolation monitor configured to conduct second isolation testing to test electrical isolation of the second marine drive system, wherein the first isolation monitor and the second isolation monitor are communicatively connected, wherein the first isolation monitor and the second isolation monitor are configured to alternate such that the first isolation testing and the second isolation testing are performed sequentially, one at a time, and wherein the first isolation monitor and the second isolation monitor are configured to communicate to facilitate the alternation of the first isolation testing and the second isolation testing.

In one embodiment, the first electric marine drive and the second electric marine drive are connected to a chassis of the marine vessel such that they share a common ground.

In another embodiment, each of the first isolation monitor and the second isolation monitor are configured to apply a voltage to the chassis and measure a return. In another embodiment, wherein each of the first isolation monitor and the second isolation monitor are configured to conduct the respective first isolation testing and the second isolation testing for a predetermined testing period.

In another embodiment, each of the first isolation monitor and the second isolation monitor comprise at least two switches and each of the first isolation monitor and the second isolation monitor are configured to close a first switch for the predetermined testing period and to measure a first voltage when the first switch is closed, close a second switch for a portion of the predetermined testing period and to measure a second voltage when the first switch is closed and the second switch is closed, and determine whether electrical isolation is maintained based on the first voltage and the second voltage.

In another embodiment, one of the first isolation testing and the second isolation testing are performed at a time with a delay period therebetween.

In another embodiment, the first isolation monitor communicates to the second isolation monitor upon ending the first isolation testing, and the second isolation monitor communicates to the first isolation monitor upon ending the second isolation testing.

In another embodiment, the first isolation monitor is configured to start the first isolation testing following receipt of the communication from the second isolation monitor that the second isolation testing has ended, and the second isolation monitor is configured to start the second isolation testing following receipt of the communication from the first isolation monitor that the first isolation testing has ended.

In another embodiment, the first isolation monitor is configured to communicate to the second isolation monitor prior to starting the first isolation testing and upon ending the first isolation testing. In another embodiment, the first isolation monitor is configured to conduct the first isolation testing for a predetermined testing period and to wait a standby period between ending the first isolation testing and restarting the first isolation testing.

In another embodiment, the standby period is sufficient for completion of the second isolation testing by the second isolation monitor.

In another embodiment, the second isolation monitor is configured to start the second isolation testing after receiving the communication from the first isolation monitor that the first isolation testing is ended.

In another embodiment, the second isolation monitor is configured to wait a delay period after receiving the communication from the first isolation monitor that the first isolation testing is ended before starting the second isolation testing.

In another embodiment, the second isolation monitor is configured to stop the second isolation testing upon receiving the communication from the first isolation monitor that the first isolation testing is starting.

In another embodiment, the system includes a communication bus connecting the first isolation monitor and the second isolation monitor, wherein the first isolation monitor and the second isolation monitor are configured to communicate via the communication bus.

In another aspect of the disclosure, a method of electrical isolation testing for a marine propulsion system that includes a first marine drive system that includes at least a first electric marine drive powered by a first power storage system and a second marine drive system that includes a second electric marine drive powered by a second power storage system, a first isolation monitor configured to conduct first isolation testing to test electrical isolation of the first marine drive system, a second isolation monitor configured to conduct second isolation testing to test electrical isolation of the second marine drive system, the method includes conducting the first isolation testing of the first marine drive system with the first isolation monitor, upon ending the first isolation testing, communicating a first end signal indicating an end of the first isolation testing from the first isolation monitor to the second isolation monitor, upon receiving the first end signal, conducting the second isolation testing of the second marine drive system with the second isolation monitor.

In one embodiment, the first isolation monitor and the second isolation monitor are configured to alternate such that the first isolation testing and the second isolation testing are performed sequentially, one at a time.

In another embodiment, the method includes, upon ending the second isolation testing, communicating a second end signal indicating an end of the second isolation testing from the second isolation monitor to the first isolation monitor, and upon receiving the second end signal, conducting the first isolation testing of the first marine drive system with the second isolation monitor.

In another embodiment, the method includes the second isolation monitor waiting a delay period after receiving the communication from the first isolation monitor that the first isolation testing is ended before starting the second isolation testing.

In another embodiment, the method includes prior to conducting the first isolation testing, communicating a first start signal indicating a start of the first isolation testing from the first isolation monitor to the second isolation monitor, and upon receiving the first start signal, stopping the second isolation testing of the second marine drive system with the second isolation monitor.

In another embodiment, wherein the marine propulsion system further includes a third marine drive system that includes at least a third electric marine drive powered by a third power storage system, and a third isolation monitor configured to conduct third isolation testing to test electrical isolation of the first marine drive system, the method further includes, upon ending the second isolation testing, communicating a second end signal indicating an end of the second isolation testing from the second isolation monitor to the third isolation monitor, and upon receiving the second end signal, conducting the third isolation testing of the third marine drive system with the third isolation monitor.

Various other features, objects, and advantages of the invention will be made apparent from the following description taken together with the drawings.

BRIEF DESCRIPTION OF THE DRAWINGS

The present disclosure includes the following Figures.

DETAILED DESCRIPTION

The present disclosure relates to a marine propulsion system for propelling a marine vessel that includes at least two isolated electrical marine drive systems and methods of electrical isolation testing for the marine propulsion systems. The inventors have recognized that methods and systems are needed for conducting isolation testing of high voltage systems having multiple isolated high voltage marine drive systems, where each marine drive system has its own separate power storage system (e.g., battery pack), particularly where the marine drive systems have a shared connection to a chassis or other shared ground arrangement. In such an embodiment, the isolation testing of two marine drive systems simultaneously would cause electrical interference that would prevent accurate electrical isolation measurements to confirm electrical isolation, or would otherwise significantly complicate the isolation testing procedures and systems needed for each marine drive system.

Given those challenges, the inventors have developed the disclosed method of testing electrical isolation of a high voltage system with multiple marine drive systems connected to a common ground by using separate isolation monitors for each marine drive system that test each marine drive system for electrical isolation alternately, one at a time. The system includes at least one isolation monitor for each marine drive system, thereby facilitating multiple independent and electrically isolated marine drive systems to each be monitored for electrical isolation from the vessel chassis. A communication link connects each of the plurality of isolation monitors. In one embodiment, the isolation monitors are configured to utilize the communication link to communicate the start and/or end of electrical isolation testing of a marine drive system so as to synchronize and alternate testing by each of the isolation monitors without the need for sharing a timestamp or common clock. In one embodiment, the first isolation monitor is configured to start the first isolation testing following receipt of the communication from the second isolation monitor that the second isolation testing has ended, and the second isolation monitor is configured to start the second isolation testing following receipt of the communication from the first isolation monitor that the first isolation testing has ended. The difference with this invention is that multiple isolation monitors can be used on one vessel. The old way was to be limited to a single isolation monitor on a vessel but this cannot monitor two isolated high voltage propulsors on the same vessel.

Figure 1:
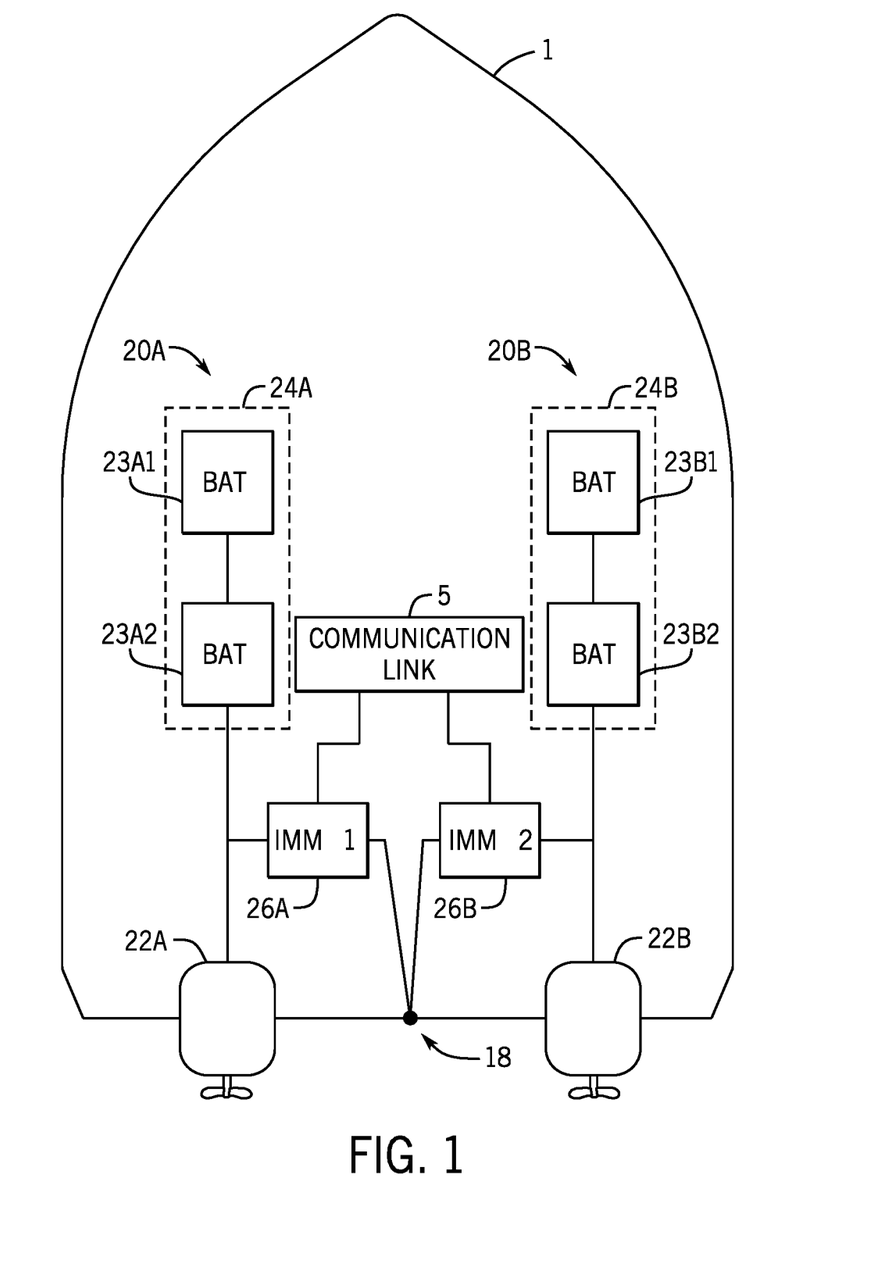
FIG. 1 is a schematic depiction of a marine vessel having an exemplary electric marine propulsion system according to one embodiment of the present disclosure.

Referring now to FIG. 1, the marine propulsion system may include at least two marine drive systems, including a first marine drive system 20A comprising a first electric marine drive 22A. The marine drive 22A is powered by a first power storage system 24A, wherein the first power storage system 24A may comprise one or more batteries 23A1, 23A2. A second marine drive system 20B comprising a second electric marine drive 22B powered by a second power storage system 24B that includes one or more batteries 23B1, 23B2. A first isolation monitor 26A is configured to conduct first isolation testing to test electrical isolation of the first marine drive system 20A. A second isolation monitor 26B is configured to conduct second isolation testing to test electrical isolation of the second marine drive system 20B. The first electric marine drive 22A and the second electric marine drive 22B are each connected to a chassis 18 of the marine vessel 1 such that they share a common ground. The electric marine drives 22A, 22B are electrically isolated other than the common ground.

In view of the shared ground connect, the system is configured to alternate isolation testing such that each marine drive system is tested alone, one at a time. Thus, the system is configured such that the first isolation testing and the second isolation testing are performed sequentially, one at a time, on a continuous cycle described in greater detail below. To determine whether electrical isolation is maintained of the first marine drive system 20A and the second marine drive system 20B, the first isolation monitor 26A and the second isolation monitor 26B respectively are configured to apply a voltage to the chassis 18 and measure a return during their respective predetermined isolation testing period, as described in greater detail below.

The first isolation monitor 26A and the second isolation monitor 26B are communicatively connected by a communication link 5, which may be any means of communication between the two isolation monitors. The first isolation monitor 26A and the second isolation monitor 26B are configured to communicate to facilitate the alternation of the first isolation testing and the second isolation testing. Communication between the first isolation monitor 26A and the second isolation monitor 26B may be analog, digital, or any other means of communication. In one embodiment, the communication link 5 is a physical communication connection, such as a communication bus (e.g., a CAN (controller area network) bus) that connects the first isolation monitor 26A and the second isolation monitor 26B, wherein the first isolation monitor 26A and the second isolation monitor 26B are configured to communicate via the communication bus. In other embodiments, the communication link may be via wireless means, such as by any appropriate wireless communication protocol.

Figure 2:
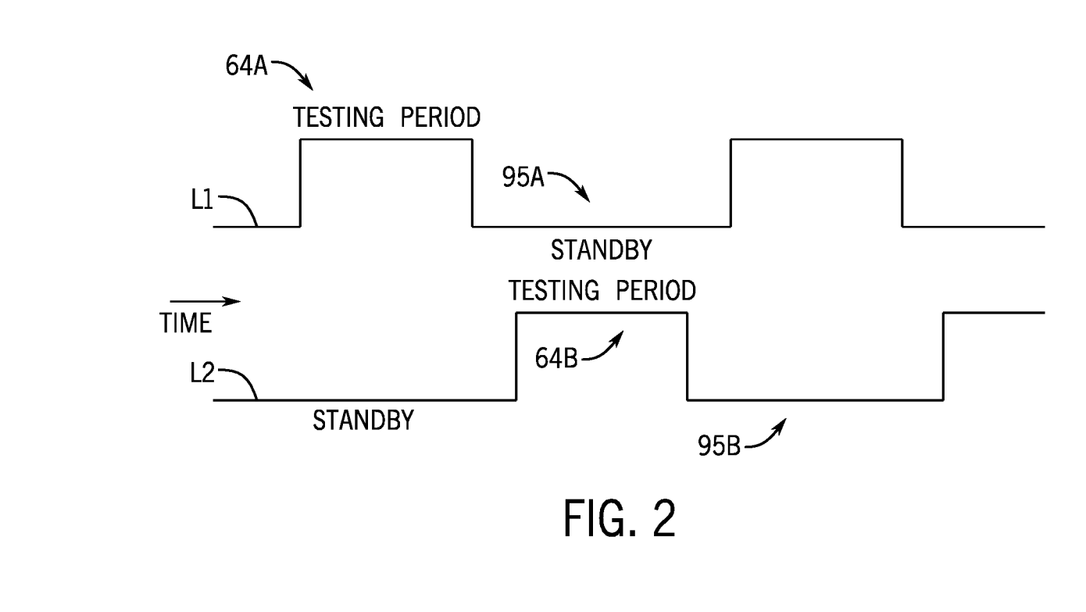
FIG. 2 is a schematic depiction of exemplary isolation testing for a first isolation monitor and a second isolation monitor in accordance with the present disclosure.

Referring now to FIG. 2, each of the first isolation monitor and the second isolation monitor (whose isolation testing is indicated by lines L1 and L2 respectively) are configured to conduct the respective first isolation testing and the second isolation testing for a predetermined testing period 64A, 64B. In one embodiment, the start and/or end of the predetermined testing period 64A, 64B may be indicated by a first/second start signal and/or a first/second end signal communicated between the first and second isolation monitors via the communication bus. For example, start and/or end signals, or status messages, may be communicated by the first isolation monitor to the second isolation monitor to synchronize the first isolation monitor and the second isolation monitor without the need for sharing a timestamp or common clock. The second isolation monitor may be configured to start the second isolation testing after receiving the communication from the first isolation monitor that the first isolation testing is ended. In some embodiments, the system may be configured such that the second isolation monitor also communicates start and/or end signals to the first isolation monitor, and in such an embodiment, the first isolation monitor may be configured to start the first isolation testing after receiving the communication from the second isolation monitor that the second isolation testing is ended.

In one embodiment, the first isolation monitor and second isolation monitor are configured to conduct the first isolation testing L1 and second isolation testing L2 for a predetermined testing period 64A, 64B and then to wait a standby period 95A, 95B between testing periods. Thus, each isolation monitor is configured to turn off (or stop testing) before restarting the testing for the next testing period. Both the first isolation testing and the second isolation testing may remain inactive during the alternating standby periods 95A, 95B and the predetermined testing period 64A, 64B likewise alternate between the first isolation testing L1 and the second isolation testing L2. The standby period 95A, 95B may exceed the length of time of the predetermined testing period 64A, 64B to prevent an overlap or conflict between the first isolation testing and the second isolation testing.

Figure 3:
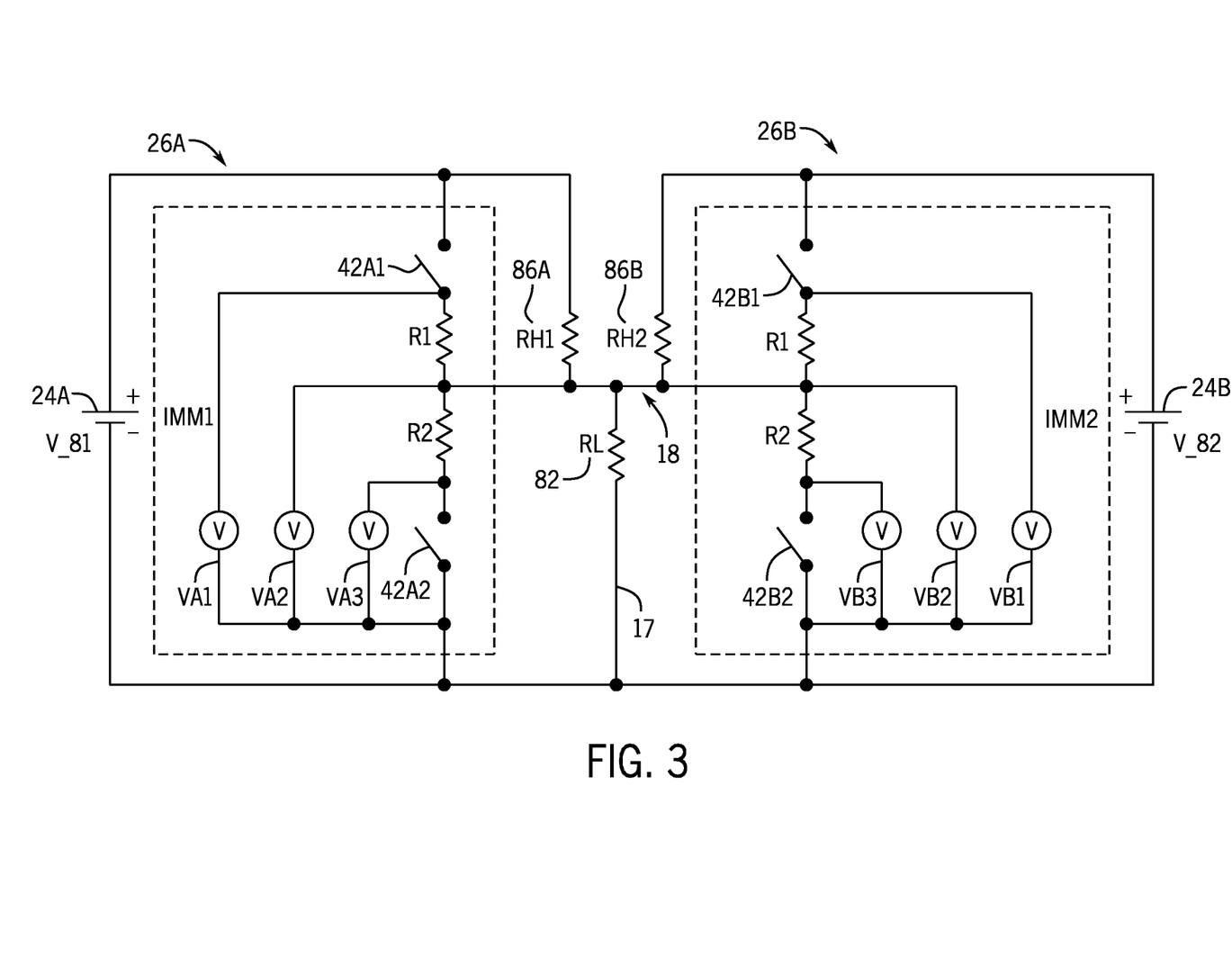
FIG. 3 is a circuit diagram of exemplary first and second isolation monitors in accordance with the present disclosure.
Figure 4:
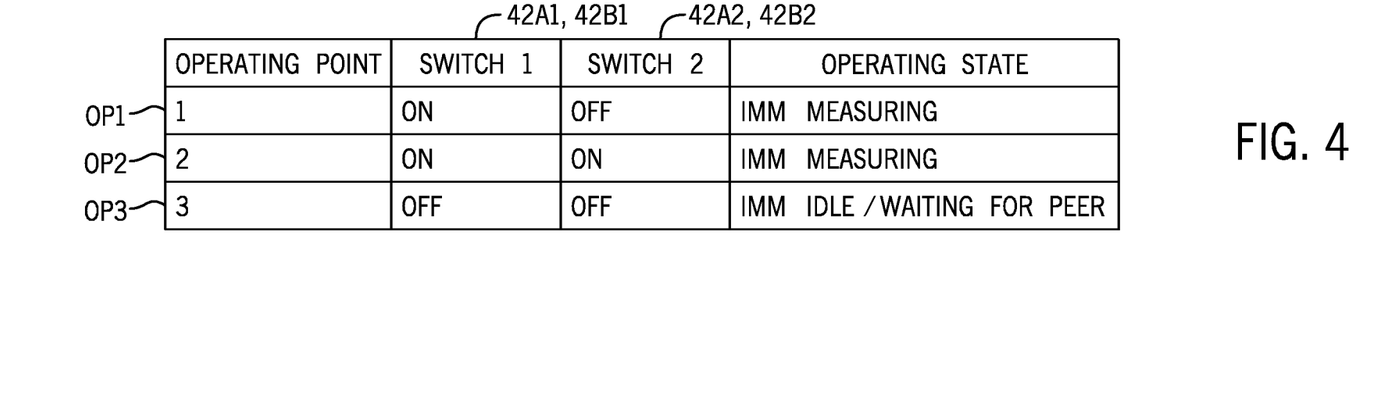
FIGS. 4-5 are schematic depictions of exemplary isolation testing for the first and second isolation monitors shown in FIG. 3 in accordance with the present disclosure.

Isolation testing of the first marine drive system and the second marine drive system are determined separately via consecutive testing sequences. Referring now to FIG. 3 and FIG. 4, each of the first isolation monitor 26A and the second isolation monitor 26B includes at least two switches, with the first isolation monitor 26A comprising switches 42A1 and 42A2, and the second isolation monitor 26B comprising switches 42B1 and 42B2. Each of the switches 42A1, 42A2, 42B1, 42B2 may be any of various types of switching devices, such as contactors, relays, or semiconductor-type switches such as MOSFET switches. Each isolation monitor operates its respective switches 42A, 42B throughout its testing period to conduct isolation testing, including to start and stop the testing and to vary the voltage during the testing period. In the depicted example, each of the first isolation monitor 26A and the second isolation monitor 26B are configured, as depicted by OP1 (illustrated in FIG. 4), to close a respective first switch 42A1, 42B1 for the predetermined testing period and to measure a first voltage across each of several points in the circuit such as those indicated by VA1, VA2, and VA3 when the first switch 42A1, 42B1 is closed and the second switch 42A2, 42B2 remains open. Start and/or stop signals sent from the first isolation monitor 26A and the second isolation monitor 64B may be timed and sent relative to opening and closing of the first switch 42A1, 42B1 to start and stop the respective isolation testing. Closing the first switch 42A1, 42B1 starts the predetermined testing period (as depicted by OP1 in FIG. 4) and opening the first switch 42A1, 42B1 ends the predetermined testing period.

After measuring the first voltage, the first isolation monitor 26A and the second isolation monitor 26B are configured to close a respective second switch 42A2, 42B2 at OP2 for a portion of the predetermined testing period and to measure a second voltage across each of several points in the circuit such as those indicated by VB1, VB2, and VB3 when the first switch 42A1, 42B1 and the second switch 42A2, 42B2 are closed. The first and second isolation monitors 26A and 26B determine whether electrical isolation is maintained based on the first voltage and the second voltage. Measurements of the first and second voltages within each respective isolation monitor 26A, 26B are used to calculate resistance values by which electrical isolation of the system is determined. Referring again to FIG. 3, a high side resistance 86A, 86B between the chassis 18 and a high side of the power storage system 24A, 24B is determined, and a low side resistance 82 between the chassis and a negative terminal of the respective power storage system is also determined.

As depicted in FIG. 4, each isolation monitor may transition to a disconnected state (OP3) for the standby period where the respective set of switches 42A1 and 42A2, 42B1 and 42B2 are both in the open state. There, the isolation monitor is in a standby or inactive mode, awaiting a signal or predetermined amount of time for the other isolation monitor to complete isolation testing before reconnecting to the marine drive system for isolation testing by closing the first switch 42A1, 42B1. By opening both the first switch 42A1, 42B1 and the second switch 42A2, 42B2 in OP3, the respective isolation monitor 26A, 26B is effectively removed from the chassis 18.

Figure 5:
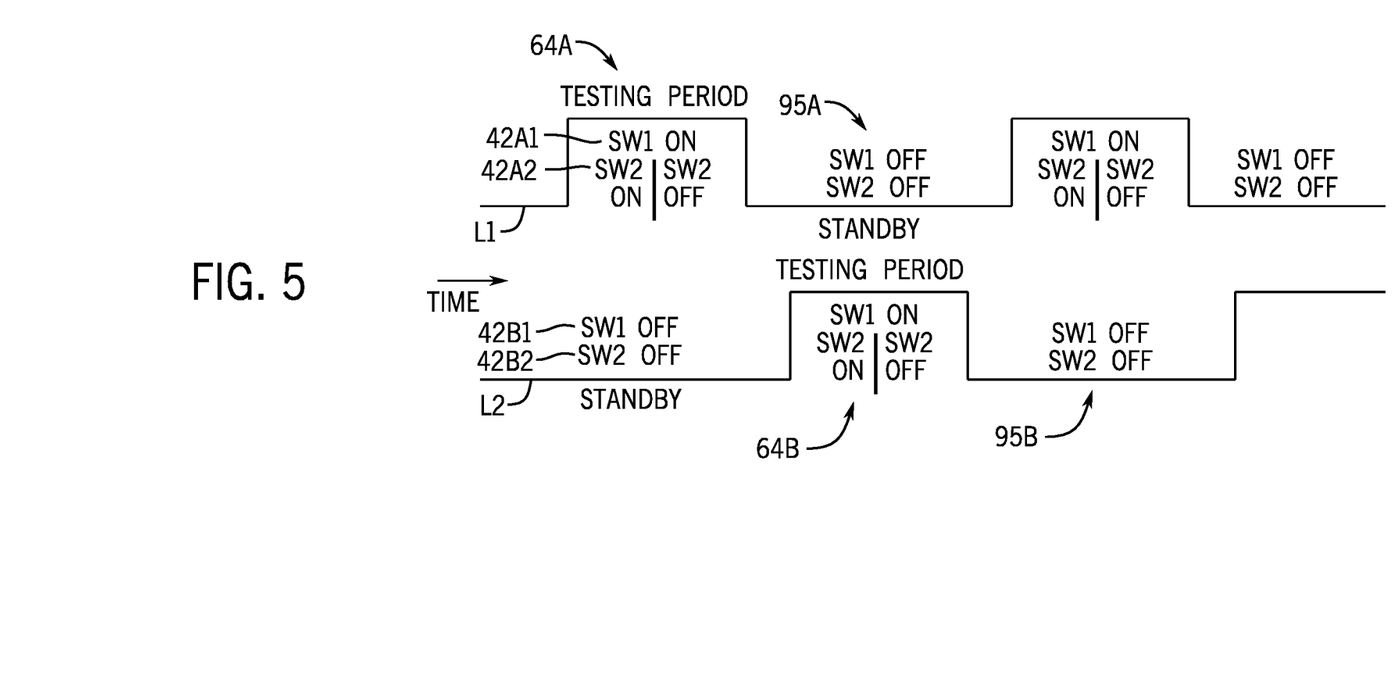

As illustrated in FIG. 5, the closing and/or opening on the first switch 42A1, 42B1 and the second switch 42A2, 42B2 starts and ends the predetermined testing period 64A, 64B. During each testing period, the isolation monitor maintains its second switch SW2 (42A2, 42B2) in the off/open position for a portion of the testing period while the first voltage is measured (OP1 in FIG. 4) and then closes the second switch SW2 for a portion of the predetermined testing period to measure the second voltage while both the first switch SW1 and the second switch SW2 are closed. In the exemplary embodiment shown in FIG. 5, the testing is performed such that both the first switch SW1 and the second switch SW2 are closed for the first portion of the measurement period such that the above-described second voltage is measured, then the second switch SW2 is turned off (e.g., opened) such that the above-described first voltage value is measured. In other embodiments, the order of switch operation may be different, such as operating only the first switch SW1 for the first portion of the testing period and then closing the second switch SW2 for a second portion of the testing period. The isolation monitor in standby, and thus not operating to perform testing, maintains an open position for both switches.

Figure 6:
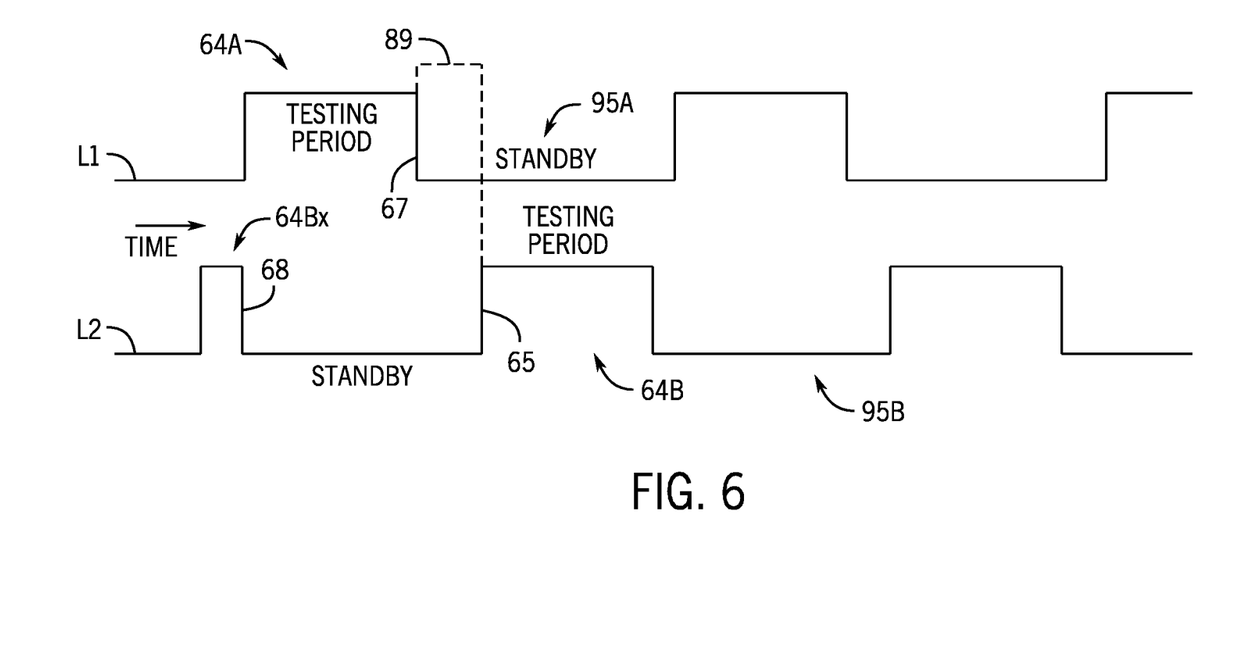
FIG. 6 is another schematic depiction of an exemplary isolation testing process involving a first isolation monitor and a second isolation monitor, in accordance with the present disclosure.

Referring now to FIG. 6, the first isolation monitor communicates to the second isolation monitor upon ending a predetermined testing period 64A of the first isolation testing L1. The second isolation monitor is configured to start the predetermined testing period 64B of the second isolation testing L2 following receipt of the communication from the first isolation monitor that the first isolation testing L1 during the predetermined testing period 64A has ended.

Similarly, the second isolation monitor is configured to stop the second isolation testing upon receipt of a communication from the first isolation monitor that the first isolation testing is about to commence or is in process of commencing. Thus, if the first and second isolation testing cycles become out of synch, the first isolation monitor may interrupt testing by the second isolation monitor. As shown in FIG. 6, the second isolation testing is in process when the first isolation monitor communicates a signal indicating that is starting the first isolation testing. Accordingly, the second isolation testing period 64Bx is cut short and is not completed. The second isolation monitor is configured to then start the standby period and/or wait for signal from the first isolation monitor that the first isolation testing is complete. Thereby, the testing processes become re-synched.

In one configuration for facilitating the process shown in FIG. 6, communication between the first isolation monitor and the second isolation monitor is one-directional, wherein the first isolation monitor determines the start and/or end of the second isolation testing by indicating to the second isolation monitoring when the first isolation testing is complete. The first isolation monitor may be configured to communicate the signal via the communication bus indicating the start of a predetermined testing period 64A, 64B before closing the first switch, and thus prior to the rising edge 65 of the predetermined testing period 64A. Reflecting an electrical master-slave configuration, this means if there is a timing disparity between the first and the second isolation monitoring and the execution of their respective isolation testing, the isolation testing L1 of the first isolation monitor will take precedence and the second isolation monitoring will stop the second isolation monitoring of the second marine drive system if the testing was started or is underway when isolation testing of the first marine drive system starts.

In some embodiments, the start of the second isolation testing may be signal dependent based on an end signal from the first isolation monitor. Namely, the system may be configured as a master-slave arrangement where the start of the predetermined testing period for the second isolation monitor is dependent on receiving the end signal timed with the falling edge 67 of the predetermined first testing period 64A of the first isolation testing L1. Thereby, the predetermined testing period 64B of the second isolation testing L2 will not overlap with the first isolation testing period.

In some embodiments, one or both of the first isolation testing and the second isolation testing are performed at a time with a delay period 89 therebetween. The second isolation monitor may be configured to wait a delay period 89 after receiving the communication from the first isolation monitor that the predetermined testing period 64A of the first isolation testing L1 is ended before starting the second isolation testing predetermined testing period 64B. The standby period 89 may include the time between the end of the predetermined testing period 64A of the first isolation testing and the next predetermined testing period of the first isolation testing. I delay period 89 is a portion of the standby period 95A, such as less than the difference period between the standby period and the testing period so as not to cause an overlap between the first and second testing periods.

Figure 7:
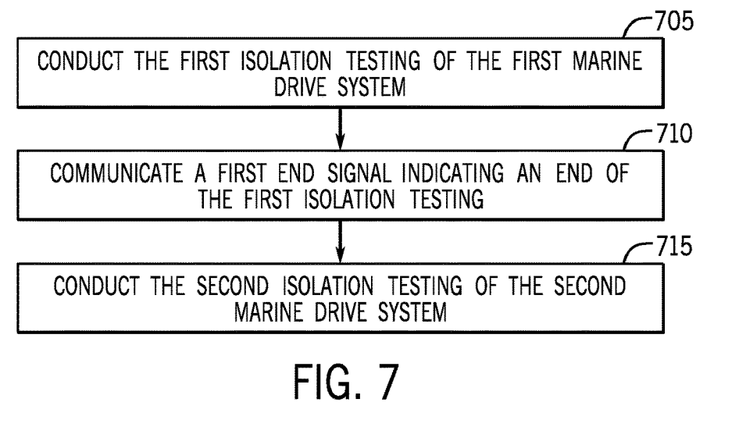
FIGS. 7-9 illustrate exemplary methods for electrical isolation testing for a marine propulsion system, in accordance with embodiments of the present disclosure.

Referring now to FIG. 7, exemplary method steps for electrical isolation testing for a marine propulsion system are illustrated. At 705, the first isolation testing of the first marine drive system is conducted with the first isolation monitor. The first isolation testing includes the closing of a first switch and a second switch in the first isolation monitor. The first isolation testing occurs during a predetermined testing period, wherein the first switch is closed for the predetermined testing period and the second switch is closed for a portion of the predetermined testing period. The first voltage is measured when the first switch is closed. The second switch is then closed and a second voltage is measured when the first switch is closed and the second switch is closed. These two voltage measurements, which in other embodiments may be performed in the opposite order (as shown in FIG. 5) are used to determine whether electrical isolation is maintained. At 710, upon ending the first isolation testing, a first end signal is communicated indicating an end of the first isolation testing from the first isolation monitor to the second isolation monitor. At 715, upon receiving the first end signal, the second isolation testing of the second marine drive system is conducted with the second isolation monitor by controlling the switches in the second isolation monitor in a similar fashion as described above for the first isolation testing.

Figure 8:
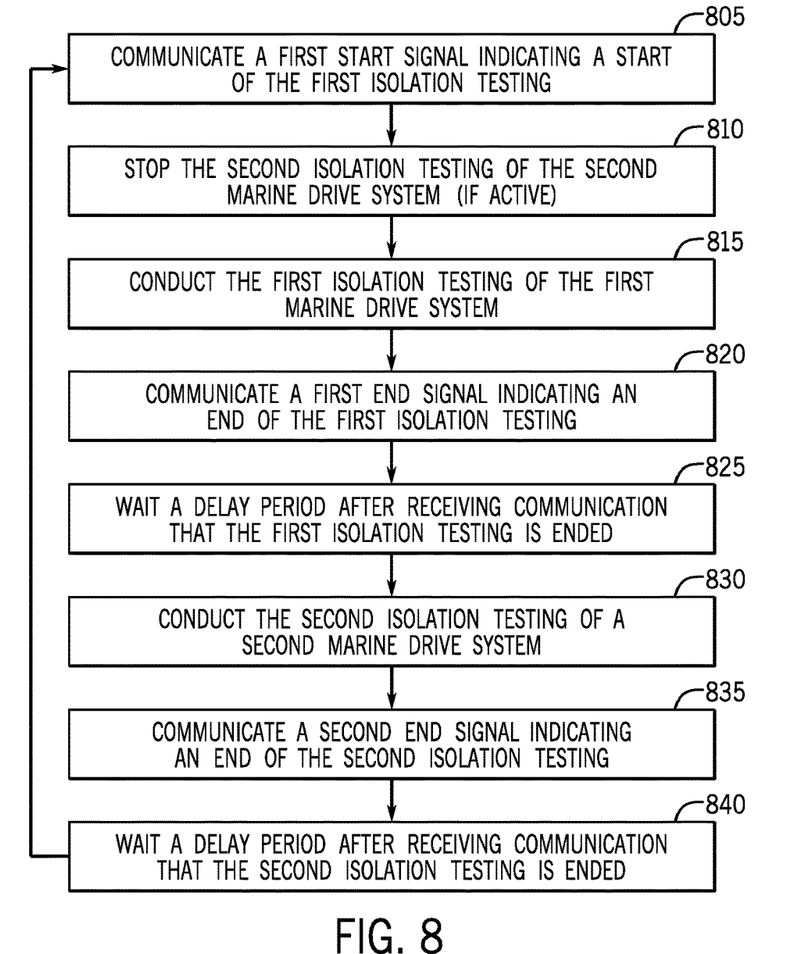

FIG. 8 illustrates other exemplary method steps for electrical isolation testing for a marine propulsion system. At 805, a first start signal is communicated indicating a start of the first isolation testing. At 810, the second isolation testing of the second marine drive system is stopped by the second isolation monitor, if active. At 815, the first isolation testing of the first marine drive system is conducted by the first isolation monitor. At 820, a first end signal is communicated via the communication link indicating an end of the first isolation testing. At 825, the second marine drive system waits a delay period after receiving communication that the first isolation testing is ending. In one embodiment, the delay period may ensure that the second isolation testing does not overlap with first isolation testing. At 830, the second isolation testing of the second marine drive system is conducted by the second isolation monitor. At 835, a second end signal indicating an end of the second isolation testing is communicated. At 840, the first marine drive system waits a delay period after receiving communication that the second isolation testing is ending, after which the method steps starting at step 805 repeat.

Repetition of these method steps may occur continuously for the duration of activation of the marine propulsion system, thereby continuing to confirm electrical isolation of the connected marine drive systems. For example, each predetermined isolation testing period may be on the order of a few seconds, such as a predetermined amount between 1 and 10 seconds, such as 3 seconds or 5 seconds. System resistance values are calculated for each testing period, as described herein. Determining a high side or slow side resistance value that is less than a predetermined resistance may indicate that the respective marine drive system is no longer electrically isolated.

Figure 9:
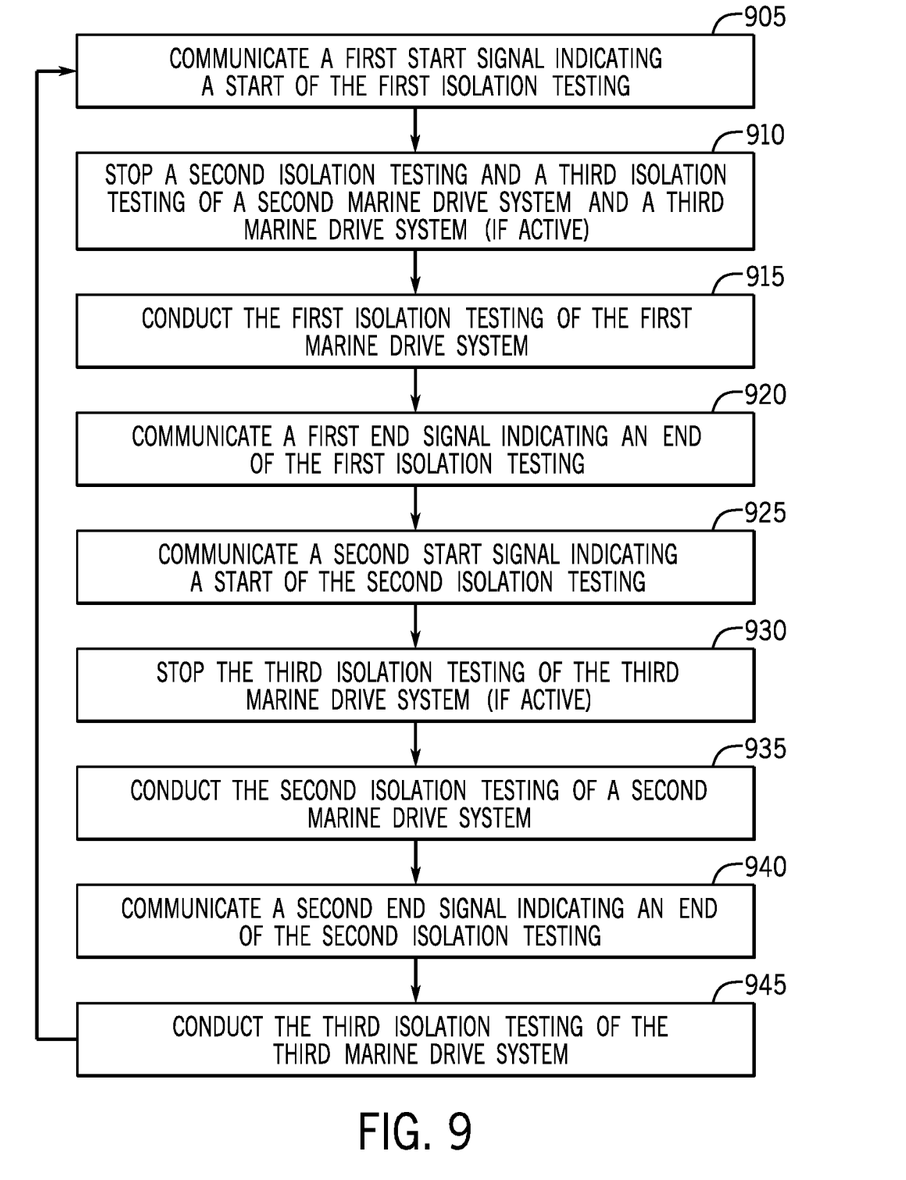

FIG. 9 illustrates exemplary method steps for electrical isolation testing for a marine propulsion system. Here, the marine propulsion system includes three marine drive systems which are all separately tested, one at a time, in series. At 905, a first start signal is communicated indicating a start of the first isolation testing. At 910, a second isolation testing and a third isolation testing of the respective second marine drive system and third marine drive system (if active) is stopped. In one embodiment, a master-slave connection may exist between the first isolation testing and both the second isolation testing and the third isolation testing, wherein the start of the second isolation testing is dependent upon receiving an end signal from the first isolation testing and the start of the third isolation testing is dependent on receiving the end signal from the second isolation testing. At 915, the first isolation testing of the first marine drive system is conducted. At 920, a first end signal is communicated indicating an end of the first isolation testing. At 925, a second start signal is communicated indicating a start of the second isolation testing. At 930, the third isolation testing of the third marine drive system is stopped (if active). At 935, the second isolation testing of a second marine drive system is conducted. At 940, a second end signal is communicated indicating an end of the second isolation testing. At 945, the third isolation testing is conducted over the third marine drive system. The testing cycle then repeats, starting with the first isolation testing.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A marine propulsion system for propelling a marine vessel comprising:
 at least two marine drive systems, including a first marine drive system comprising a first electric marine drive powered by a first power storage system and a second marine drive system comprising a second electric marine drive powered by a second power storage system;
 a first isolation monitor configured to conduct first isolation testing to test electrical isolation of the first marine drive system;
 a second isolation monitor configured to conduct second isolation testing to test electrical isolation of the second marine drive system;
 wherein the first isolation monitor and the second isolation monitor are communicatively connected;
 wherein the first isolation monitor and the second isolation monitor are configured to alternate such that the first isolation testing and the second isolation testing are performed sequentially, one at a time; and
 wherein the first isolation monitor and the second isolation monitor are configured to communicate to facilitate the alternation of the first isolation testing and the second isolation testing.

2. The system of claim 1, wherein the first electric marine drive and the second electric marine drive are connected to a chassis of the marine vessel such that they share a common ground.

3. The system of claim 1, wherein each of the first isolation monitor and the second isolation monitor are configured to apply a voltage to a chassis and measure a return.

4. The system of claim 3, wherein each of the first isolation monitor and the second isolation monitor are configured to conduct the respective first isolation testing and the second isolation testing for a predetermined testing period.

5. The system of claim 4, wherein each of the first isolation monitor and the second isolation monitor comprise at least two switches and each of the first isolation monitor and the second isolation monitor are configured to:
 close a first switch for the predetermined testing period and to measure a first voltage when the first switch is closed;
 close a second switch for a portion of the predetermined testing period and to measure a second voltage when the first switch is closed and the second switch is closed; and
 determine whether electrical isolation is maintained based on the first voltage and the second voltage.

6. The system of claim 1, wherein one of the first isolation testing and the second isolation testing are performed at a time with a delay period therebetween.

7. The system of claim 1, wherein the first isolation monitor communicates to the second isolation monitor upon ending the first isolation testing, and the second isolation monitor communicates to the first isolation monitor upon ending the second isolation testing.

8. The system of claim 7, wherein the first isolation monitor is configured to start the first isolation testing following receipt of the communication from the second isolation monitor that the second isolation testing has ended, and the second isolation monitor is configured to start the second isolation testing following receipt of the communication from the first isolation monitor that the first isolation testing has ended.

9. The system of claim 1, wherein the first isolation monitor is configured to communicate to the second isolation monitor prior to starting the first isolation testing and upon ending the first isolation testing.

10. The system of claim 9, wherein the first isolation monitor is configured to conduct the first isolation testing for a predetermined testing period and to wait a standby period between ending the first isolation testing and restarting the first isolation testing.

11. The system of claim 10, wherein the standby period is sufficient for completion of the second isolation testing by the second isolation monitor.

12. The system of claim 9, wherein the second isolation monitor is configured to start the second isolation testing after receiving the communication from the first isolation monitor that the first isolation testing is ended.

13. The system of claim 12, wherein the second isolation monitor is configured to wait a delay period after receiving the communication from the first isolation monitor that the first isolation testing is ended before starting the second isolation testing.

14. The system of claim 12, wherein the second isolation monitor is configured to stop the second isolation testing upon receiving the communication from the first isolation monitor that the first isolation testing is starting.

15. The system of claim 1, further comprising a communication bus connecting the first isolation monitor and the second isolation monitor, wherein the first isolation monitor and the second isolation monitor are configured to communicate via the communication bus.

16. A method of electrical isolation testing for a marine propulsion system comprising a first marine drive system comprising at least a first electric marine drive powered by a first power storage system and a second marine drive system comprising a second electric marine drive powered by a second power storage system, a first isolation monitor configured to conduct first isolation testing to test electrical isolation of the first marine drive system, a second isolation monitor configured to conduct second isolation testing to test electrical isolation of the second marine drive system, the method comprising:
conducting the first isolation testing of the first marine drive system with the first isolation monitor;
upon ending the first isolation testing, communicating a first end signal indicating an end of the first isolation testing from the first isolation monitor to the second isolation monitor; and
upon receiving the first end signal, conducting the second isolation testing of the second marine drive system with the second isolation monitor.

17. The method of claim 16, wherein the first isolation monitor and the second isolation monitor are configured to alternate such that the first isolation testing and the second isolation testing are performed sequentially, one at a time.

18. The method of claim 16, further comprising:
upon ending the second isolation testing, communicating a second end signal indicating an end of the second isolation testing from the second isolation monitor to the first isolation monitor; and
upon receiving the second end signal, conducting the first isolation testing of the first marine drive system with the first isolation monitor.

19. The method of claim 16, further comprising waiting a delay period after receiving the communication from the first isolation monitor that the first isolation testing is ended before starting the second isolation testing with the second isolation monitor.

20. The method of claim 16, further comprising:
prior to conducting the first isolation testing, communicating a first start signal indicating a start of the first isolation testing from the first isolation monitor to the second isolation monitor; and
upon receiving the first start signal, stopping the second isolation testing of the second marine drive system with the second isolation monitor.

21. The method of claim 16, wherein the marine propulsion system further comprises a third marine drive system comprising at least a third electric marine drive powered by a third power storage system, and a third isolation monitor configured to conduct third isolation testing to test electrical isolation of the first marine drive system, the method further comprising:
upon ending the second isolation testing, communicating a second end signal indicating an end of the second isolation testing from the second isolation monitor to the third isolation monitor; and
upon receiving the second end signal, conducting the third isolation testing of the third marine drive system with the third isolation monitor.

* * * * *